(12) United States Patent
Umeda et al.

(10) Patent No.: US 6,388,358 B1
(45) Date of Patent: *May 14, 2002

(54) STATOR OF AC-GENERATOR AND METHOD OF MANUFACTURING THE SAME

(75) Inventors: Atsushi Umeda, Okazaki; Tsutomu Shiga, Nukata-gun; Shin Kusase, Obu, all of (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,518

(22) Filed: Nov. 15, 1999

(30) Foreign Application Priority Data

Nov. 25, 1998 (JP) .............................................. 10-334387

(51) Int. Cl.⁷ .......................... H02K 3/32; H02K 1/22; H02K 3/04
(52) U.S. Cl. ..................... 310/201; 310/60 A; 310/179; 310/254
(58) Field of Search ............................. 310/5, 2, 60 A, 310/59, 60 R, 201, 179, 180, 208, 195, 184, 189, 260, 263; 29/596–598

(56) References Cited

U.S. PATENT DOCUMENTS

| | | | |
|---|---|---|---|
| 4,739,643 A | | 4/1988 | Kuriyama et al. |
| 5,619,088 A | * | 4/1997 | Yumiyama et al. .......... 310/270 |
| 5,936,326 A | | 8/1999 | Umeda et al. |
| 5,952,749 A | | 9/1999 | Umeda et al. |
| 5,955,804 A | | 9/1999 | Kusase et al. |
| 5,896,375 A | | 11/1999 | Umeda et al. |

FOREIGN PATENT DOCUMENTS

| | | |
|---|---|---|
| EP | 0 251 207 | 1/1988 |
| EP | 0 878 893 A1 | 11/1988 |
| EP | 0 881 747 A2 | 12/1998 |
| GB | 2 105 117 | 3/1983 |
| WO | 92/06527 | 4/1992 |
| WO | 98/40953 | 9/1998 |
| WO | 98/54823 | 12/1998 |

\* cited by examiner

Primary Examiner—Tran Nguyen
(74) Attorney, Agent, or Firm—Pillsbury Winthrop LLP (57) ABSTRACT

A stator of a vehicle AC generator includes a stator core, a multi-phase stator winding formed from a plurality of conductor members. The stator winding has coil-ends at opposite sides of said stator core, and portions of the conductor members in each of the coil-ends are radially aligned to have fixed radial clearances therebetween for introducing cooling air and ensuring insulation of the conductor members.

10 Claims, 7 Drawing Sheets

STATOR OF AC-GENERATOR AND METHOD OF MANUFACTURING THE SAME

CROSS REFERENCE TO RELATED APPLICATION

The present application is based on and claims priority from Japanese Patent Application Hei 10-334387, filed Nov. 25, 1998, the contents of which are incorporated herein by reference.

BACKGROUND OF THE INVENTION

1. Field of the Invention

The present invention relates to an AC generator driven by an internal combustion engine and, particularly, a vehicular AC generator that can be equipped on a vehicle such as a passenger car, a truck, or a ship.

2. Description of the Related Art

Recently, output power of AC generators has been increased to meet increase in electric loads such as safety control apparatus.

A structure for a powerful vehicular AC generator is well known, as disclosed in International Publication Number WO 92/06527 (1992). In the above-described conventional structure, it is proposed that U-shaped conductor members are inserted into plural slots of a stator core from the same direction and edge portions thereof are connected with each other after circumferentially bending to form a stator winding. In this structure, a higher slot-space factor of conductor members can be achieved by inserting regularly U-shaped conductor members, thereby to obtain higher output power.

In the above-described structure, however, conductor members are disposed close to each other at coil ends and clearances therebetween are small due to a high slot-space factor thereof. Therefore, conductor members may collide with each other at vehicular vibration or the like, thereby to damage insulation coating thereof. Conductors members also might be in contact with each other at damaged portions of insulation coating, thereby, causing an electric short-circuit.

In the above-described structure, because radial clearances between conductor members are small, centrifugal cooling-air, which includes circumferential cooling-air generated by an inner fan, cannot easily pass through the radial clearances therebetween in a circumferential direction. Therefore, it is difficult to improve cooling efficiency.

SUMMARY OF THE INVENTION

A main object of the present invention is to provide a stator which can solve the above problems and ensure reliable insulation between conductor members at coil ends.

Another object of the present invention is to provide a stator having an improved stator winding of a high cooling efficiency.

According to an aspect of the present invention, clearances are formed between conductor members at coil ends of the stator winding.

Therefore, collisions between conductor members under vehicle vibrations or the likes can be reduced. Accordingly, insulation films of conductor members are not damaged by the collisions. Furthermore, cooling air can easily pass through the radial clearances provided between conductor members in a circumferential direction, thereby improving cooling efficiency.

According to another aspect of the present invention, the clearance between the conductor members at the coil ends is larger than a clearance between the conductor members in the slots.

Because conductor members disposed in the same slot form a stator winding having the same electrical phase, electric power generation is not affected by a short circuit due to contact between conductor members in the same slot. On the other hand, because stator windings having different electrical phases different from each other are located adjacent to each other at the coil end, electric power generation is affected by a short circuit due to contact between conductor members. However, because the clearance between conductor members radially adjacent to each other is larger at the coil end than in a slot, the collisions can be reduced, so that reliable insulation between conductor members can be ensured.

According to another feature of the present invention, one conductor member is bent in an arc shape, thereby forming a clearance between the other conductor member radially adjacent thereto and one conductor member.

In this structure, it is easy to form a clearance between one conductor member and the radially adjacent another conductor member by bending one of them in arc shape.

According to another feature of the present invention, the radial width of a portion of the conductor members is reduced by forming concave portions at coil ends.

Because of the concave portions, conductor members, insulation between the conductor members can be ensured and cooling capacity of coil ends can be improved.

According to another feature of the present invention, the conductor members have the connection portions at the coil ends. They have step portions respectively formed to be thicker in the radial direction. Two conductor members can be disposed radially in close to each other near the connection portions. On the other hand, a plurality of conductor members can be separated from each other at a distance from the connection portions.

According to another feature of the present invention, a manufacturing process of a vehicular AC generator's stator includes a step of inserting plural conductor members in plural radial layers in each slot, a step of bending straight portions away from the straight portions of the other conductor members radially adjacent thereto, and a step of forming clearances between the conductor members. The step of forming clearances includes a step of bending the same straight portions of the one conductor members in opposite directions.

If the conductor members are bent, they are hardened mechanically at the bent portions. Therefore, even if once-bent conductor members are again bent at the once-bent portions in the opposite direction, the bent portions cannot restore the original straight shapes. If the straight portions of conductor members at radially opposite end layers in each slots are bent in a direction away from straight portions of conductor members radially adjacent thereto, they are hardened mechanically at the bent portions of the straight portions. Therefore, when the straight portions of conductor-members are again bent in an opposite direction to be brought near the straight portions of conductor members radially adjacent thereto, they are bent at the bent portions hardened mechanically. Therefore, the straight portions of conductor members cannot be restored to the original straight shapes and curve to form clearances between conductor members radially adjacent to each other from the bent portions to edge portions. Accordingly, clearances can be provided between conductor members radially adjacent to each other.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF PREFERRED EMBODIMENTS

A stator according to a first embodiment of the invention is described with reference to FIGS. 1–7.

Figure 1:
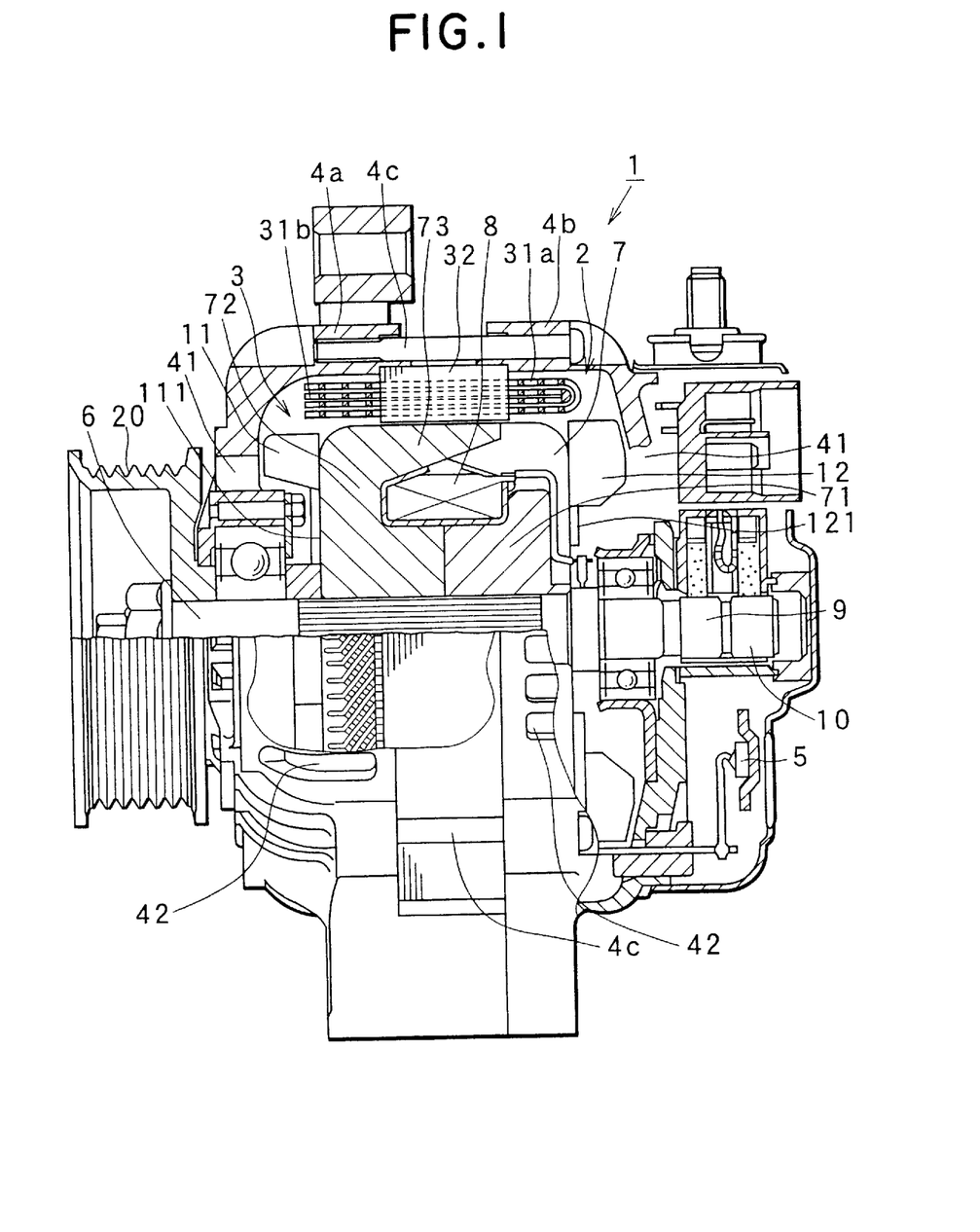
FIG. 1 is a cross-sectional view of a vehicular AC generator according to the first embodiment of the present invention.

A vehicular AC generator 1 includes stator 2 acting as an armature, a rotor 3 acting as a field core, a front housing 4a and a rear housing 4b supporting the rotor 3 and fixing the stator 2 by bolts 4c, and rectifiers 5 converting AC electric power to DC electric power.

The rotor 3 rotates with a shaft 6, and has Lundell type pole cores 7, field coils 8, slip rings 9 and 10, a mixed flow fan 11 providing cooling air and a centrifugal flow fan 12. The shaft 6 is jointed to a pulley 20, and is rotated by a vehicular engine (not shown).

The Lundell type pole cores 7 includes a pair of pole cores. The Lundell type pole cores 7 includes a boss portion 71 press-fitted to the shaft 6, disk portion 72 extending radially from both ends of the boss portion 71, and twelve claw poles 73.

The mixed flow fan 11 at a pulley side has blades inclined at an acute angle to a board 111 fixed to an end portion of a pole core 7 by such as a welder and blades projecting at right angle to the board 111, and is rotated with the rotor 3. The centrifugal flow fan 12 at opposite side of a pulley has blades projecting at right angle from a board 121 fixed to an end portion of a pole core 7 by a welder or the like.

The housing 4 has air intake windows 41 at an axial end of a stator and has air discharge windows 42 for cooling air at both shoulder portions of periphery thereof in the face to first and second coil-end groups 31a and 31b of the stator 2.

The rectifiers 5 are disposed at a side of an end portion of the vehicular AC generator 1 opposite the pulley. Accordingly, the first coil-end group 31a is disposed to correspond to these rectifiers 5.

The stator 2 includes a stator core 32, stator windings formed of plural conductor members such as coppers disposed in slots 35 provided in the stator core 32, and insulators 34 insulating the conductor members from the stator core 32. The stator core 32 is also fixed between the front housing 4a and rear housing 4b.

Figure 2:
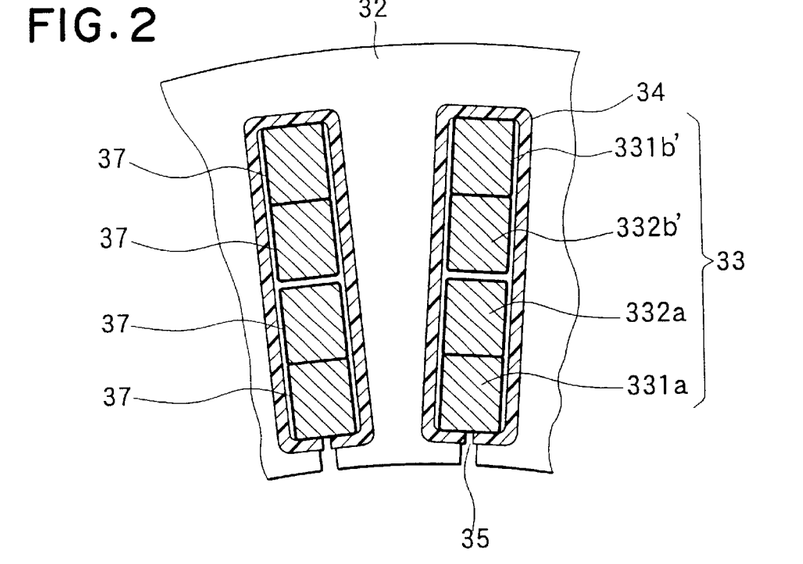
FIG. 2 is a fragmentary cross-sectional view of a stator according to the first embodiment.

As shown in FIG. 2, a plurality of slots 35 are formed in the stator core 32 so that a multi-phase stator winding composed of a plurality of phase-windings can be disposed therein. In this embodiment, thirty-six slots 35 are provided at equal intervals in the stator core 32 so that a three-phase stator winding composed of three phase-windings can be disposed therein to correspond to the number of poles of the rotor 3.

The three phase-windings disposed in the slots 35 are respectively regarded as a continuous conductor member, and an even number of conductor members (four conductor members in this embodiment) are inserted into each of plural slots 35. Four conductor members in each slot 35 are disposed in radially lined-up layers, an innermost layer, an inner-middle layer, an outer-middle layer and an outermost layer from the radial inside of the stator core 32. These conductor members are coated with insulation films 37 such as a polyamide-imide-resin film.

The conductor members are connected in a prescribed pattern to form a three-phase stator winding. In this embodiment, the conductor members disposed in the slots 35 are joined with each other by continuous portions at one side in a first coil end group 31a, and are welded to each other at the other side in the second coil end group 31b.

One conductor member disposed in one slot 35 is paired with the other conductor member disposed in the other slot 35 separated from the one slot 35 at prescribed pole pitches.

That is, one conductor member disposed at one layer in one slot 35 is paired with the other conductor member disposed at the other layer in another slot 35 separated from the one slot 35 at prescribed pole pitches. Therefore, the plural conductor members can be disposed regularly to ensure clearances therebetween at the coil-end portions.

For example, one conductor member 331a disposed at the innermost layer in one slot 35 is paired with another conductor member 331b disposed at the outermost layer in the other slot 35 separated from the one slot 35 in the clockwise direction of the stator core 32 at one pole pitch. In the same manner, one conductor member 332a disposed at the inner-middle layer in one slot 35 is paired with the other conductor member 332b disposed at the outer-middle layer in another slot 35 separated from the one slot 35 in the clockwise direction of the stator core 32 at one pole pitch.

These paired conductor members are joined or integrated with each other via continuous turn portions 331c and 332c at one axial end portion of the stator core 32.

Accordingly, at one end of the stator core 32, a continuous wire joining one conductor member disposed at the outermost layer with the other conductor member disposed at the innermost layer surrounds a continuous wire joining one conductor member disposed at the outer-middle layer with the other conductor member disposed at the inner-middle layer. That is, at one end of the stator core 32, one joined portion of paired conductor members surrounds the other joined portion of paired conductor members in the same slots. Conductor members disposed at the inner-middle and outer-middle layers are joined to one another to form an inner layer coil end, and those disposed at the innermost and outermost layers are in the same manner to form an outer layer coil end.

On the other hand, the conductor member 332a disposed at the inner-middle layer in one slot 35 is also paired with a conductor member 331a' disposed at the innermost layer in the other slot 35 separated from the one slot 35 in the clockwise direction of the stator core 32 at one pole pitch. In the same manner, a conductor member 331b' disposed at the outermost layer in one slot 35 is paired with a conductor member 332b disposed at the outer-middle layer in the other slot 35 separated from the one slot 35 in the clockwise direction of the stator core 32 at one pole pitch. Thereafter, these conductor members are connected by such as a welder at the other axial end portion of the stator core 32.

Therefore, at the other axial end portion of the stator core 32, connection portions connecting conductor members disposed at outermost and outer-middle layers are located in line with connection portions connecting conductor members disposed at the innermost and inner-middle layers. Adjacent-layer coil-ends are formed by connecting conductor members disposed at outermost and outer-middle layers and connecting conductor members disposed at innermost and inner-middle layers.

In this way, at the other axial end portion of the stator core 32, connection portions of conductor members paired with each other are located regularly without overlapping.

Figure 3:
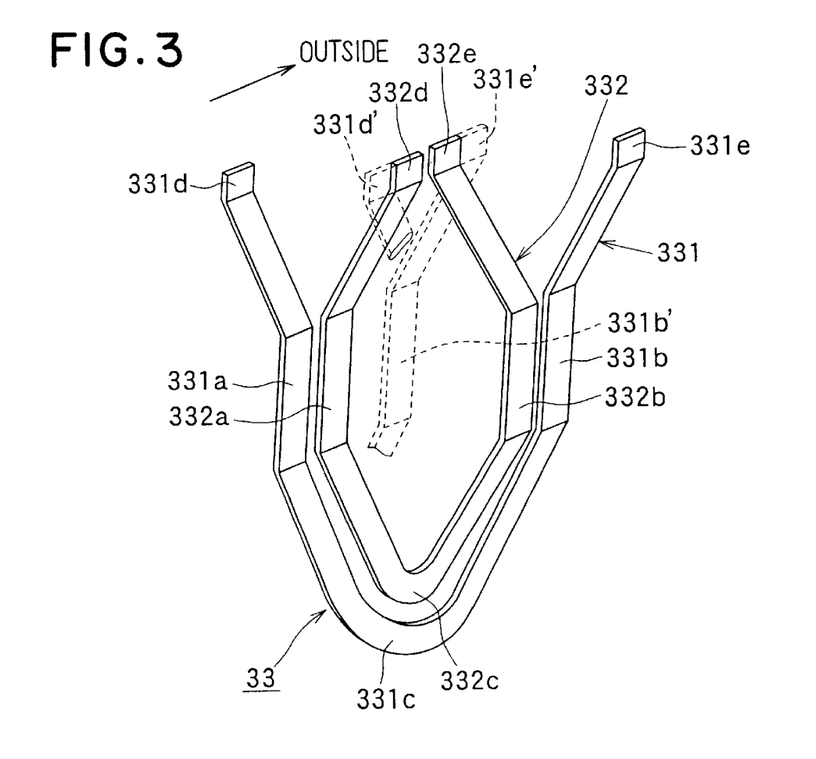
FIG. 3 is a schematic perspective view of segments according to the first embodiment.

Further, a plurality of conductor members are provided by segments, which are shaped from conductors having a rectangular cross-section and a prescribed thickness. As shown in FIG. 3, conductor members disposed at innermost and outermost layers are provided by a large segment 331, which is formed into a U-shape from a continuous conductor wire. Conductor members disposed at inner-middle and outer-middle layers are provided by a small segment 332, which is formed into a U-shape from a continuous conductor wire.

A basic segment 33 is composed of the large segment 331 and the small segment 332. The basic segments 33 are disposed regularly in slots 35 to form a two-turn winding around the stator core 32. However, a segment composing a leading wire of a stator winding and a turn portion connecting a first-turn and a second-turn windings are provided by specific segments different from the basic segment 33. In this embodiment, the number of the specific segments is three. Connecting the first turn and the second-turn windings is located between conductor members disposed at an end layer and a middle layer, thereby forming a specifically-shaped coil-end.

A method of manufacturing a stator winding are described hereafter.

The basic segments 33 are provided in a manner that a turn portion 331c of the U-shaped large segment 331 surrounds a turn portion 332c of the U-shaped small segment 332. Thereafter, they are inserted in the stator core 32 from one axial end thereof. Then, a conductor member 331a located at one side of the large segment 331 is inserted in an innermost layer of one slot, a conductor member 332a located at one side of the small segment 332 is inserted in an inner-middle layer of the one slot, a conductor member 331b located at the other side of the large segment 331 is inserted in an outermost layer of the other slot separated from the one slot in the clockwise direction of the stator core 32 at one pole pitch, and a conductor member 332b located at the other side of the small segment 332 is inserted in an outer-middle of the other slot.

As a result, as shown in FIG. 2, straight portions 331a, 332a, 332b' and 331b' are disposed in a slot forming a radial line from a innermost layer side. Here, the straight portions 332b', and 331b' are those of the big and small segments paired with each other. Further, because the conductor members 33 are provided by U-shaped segments, spring-back force is added to the conductor members in a direction of widening turn portions 331c and 332c. Therefore, a some clearance is provided between the straight portion 332b of the small segment 332 and the straight portion 331b of the large segment 331.

After the conductor members are inserted, at the second coil-end group 31b, clearances are radially provided between conductor members at the innermost and inner-middle layers and between those at outermost and outer-middle layers.

Figure 4A:
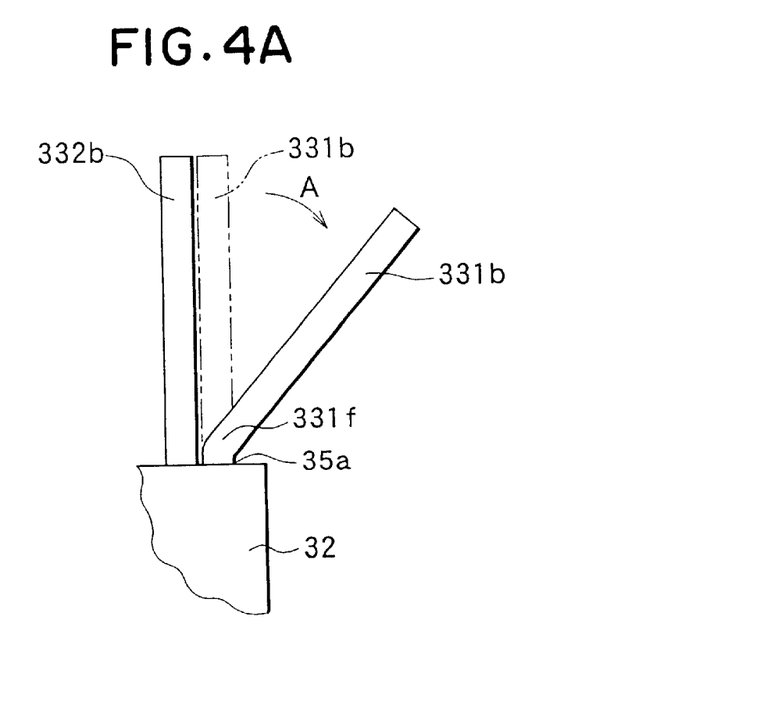
FIG. 4A and FIG. 4B are schematic diagrams illustrating bending steps according to the first embodiment.
Figure 4B:
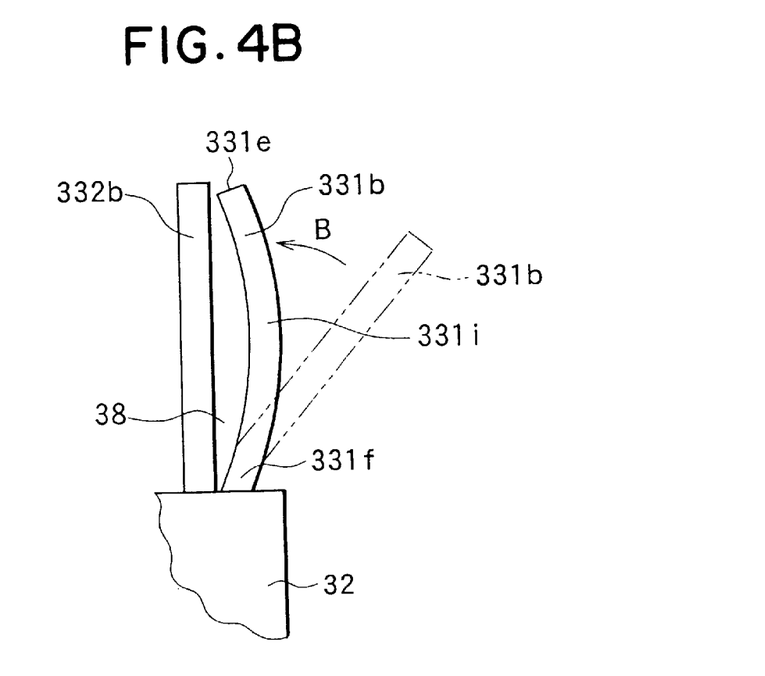
Figure 5:
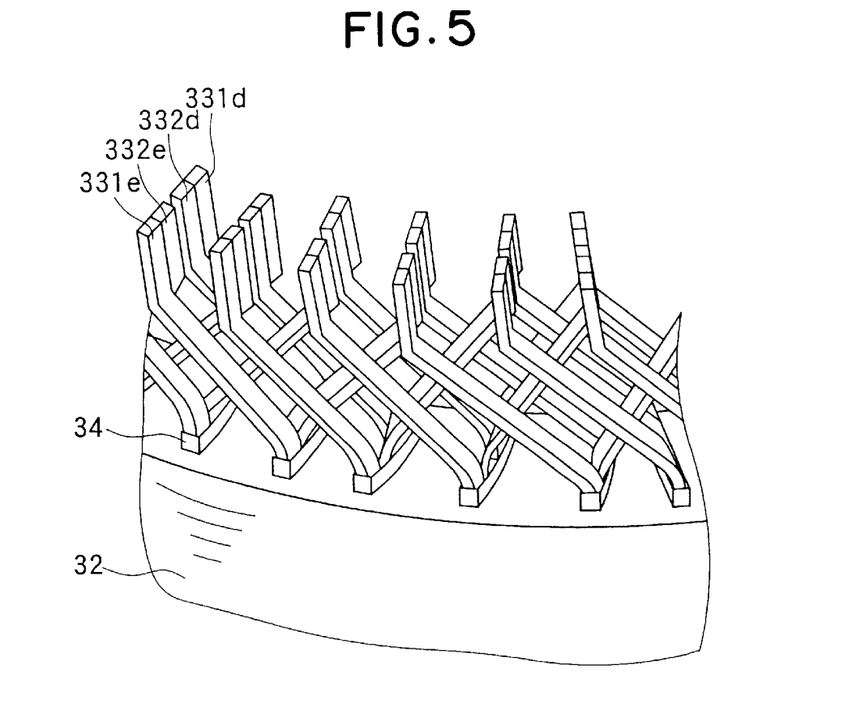
FIG. 5 is a fragmentary perspective view of a second coil-end group of the stator according to the first embodiment.

In FIGS. 4A and 4b, the straight portion 331b, as a first extended portion, extending from the outermost layer of the slot 35 is bent in a radially outside direction as ft indicated by arrow A. That is, the straight portion 331b extending from the outermost layer is bent in a direction to separate from the straight portion 332b, as a second extended portion, extending from the outer-middle layer. Then, the straight portion 331b is bent at a radially-outside outlet-portion 35a, as a second extended portion, of the slot 35 as a fulcrum. Thereafter, the radially-outside-bent straight-portion 331b extending from the outermost layer is bent in a radially opposite and inside direction, where it comes closer to the straight portion 332a extending from the outer-middle layer as indicated by arrow B.

If a conductor member is bent to incline, it is hardened mechanically at the bent portion. Therefore, even if the bent conductor member is again bent in an opposite direction at the bent portion, it cannot be restored to the original straight shape. That is, in this step, the conductor member is hardened mechanically at the bent portions 331f bent in a radially-outside direction, where it is widened. Therefore, when the straight portion 331b is again bent in a radially-inside direction, it is bent at the machine-hardened bent portion 331f as a fulcrum. Accordingly, the conductor member cannot be restored to the original straight shape, thereby forming an arc portion 331i, which is curved from the bent portion 331f to an leading edge portion 331e in a radially-outside direction. In this manner, because the conductor-member 331b disposed at the outermost-layer is radially widened at the outside of the slots 35 to form the arc portion 331i, a clearance 38 is provided between the conductor member 331b disposed at the outermost-layer and the conductor member 332b disposed at the inner-middle-layer radially adjacent thereto. Therefore, the clearance 38 between the adjacent conductor-members located at the outside of the slots 35 is larger than that therein.

In the same manner, the straight-portion 331a extending from the innermost layer is bent in a radially-inside direction of the stator core 32 in an arc line, thereby providing a clearance between the straight-portion 331a extending from the innermost layer and the straight-portion 332a extending from the inner-middle layer radially adjacent thereto. As a result, at the second coil-end group 31b, clearances are provided between the straight portion 331a extending from the innermost layer and the straight portion 332a extending from the inner-middle layer, and between the straight portion 331b extending from the outermost layer and the straight portion 332b extending from the outer-middle layer.

Thereafter, the straight portions 331a and 331b extending from the end-layers are bent in the direction to widen the large segment 331 by half a pole pitch (1.5 slot pitches in this embodiment) at connection portions 331d and 331e. The straight portions 332a and 332b extending from the middle-layers are bent in the direction to close the small segment 332 by half a pole pitch at connection portions 332d and 332e. As a result, at the second coil-end group 31b, the conductor members radially adjacent to each other are bent in the directions opposite to each other.

Above-described steps are executed for all the segments 33 in all the slots 35. Thereafter, at the second coil-end group 31b, the connection portions 331e' and 332e extending from the outermost and outer-middle layers are electrically connected and the connection portions 332d and 331d' extending from the inner-middle and innermost layers are also electrically connected by an ultrasonic welder, an arc welder, a brazing device or the like. Accordingly, as shown in a perspective view of FIG. 5, a stator is provided.

Figure 6:
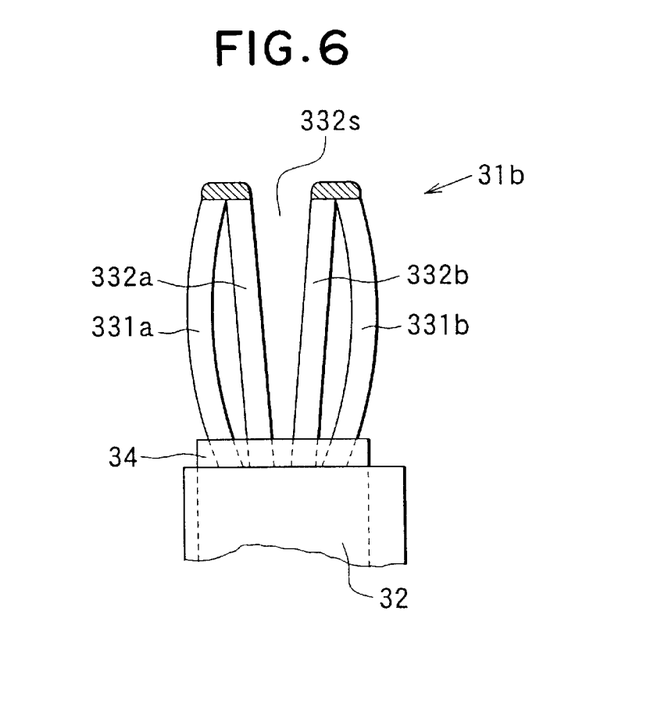
FIG. 6 is a schematic diagram illustrating the second coil-end group of the stator according to the first embodiment.
Figure 7:
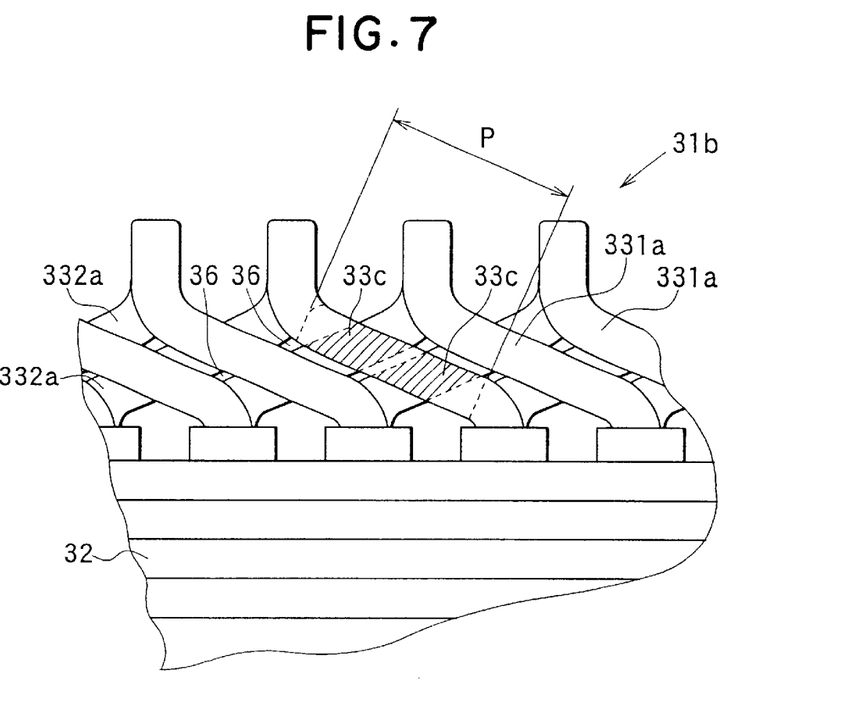
FIG. 7 is a schematic enlarged side view of the second coil-end group from inside of the stator according to the first embodiment.

As shown in FIGS. 6 and 7, clearances are provided at the second coil-end group 31b between the end-layer straight-portions 331a and 331b and the middle-layer straight-portions 332a and 332b. Therefore, the prescribed clearances are radially provided at crossing portions 33c, where the adjacent conductor members are radially overlapped.

As a result, when a vehicle vibrates, collisions can be reduced between conductor members radially adjacent to each other at the second coil-end group 31b so that damages of insulation films 37 can be reduced. Further, electrical short, generated by contacts between damaged portions of the insulation films 37, can be prevented.

As shown in FIG. 6, the straight portions are deformed to separate connection portions radially by respectively connecting the innermost and outermost layer's straight portions 331a and 331b with the middle-layer straight portions 332a and 332b at their leading edge portions. As a result, a clearance 332s between the connection portions is widened at coil-ends, thereby improving insulation performance.

Furthermore, radial clearances are provided at the crossing portions 33c located between the adjacent conductor members. Therefore, a inner-fan's centrifugal-air flow, which includes a circumferential air-flow, can pass through not only network-structural air-flow-paths 36 at the second coil-end group 31b but also radially-directional clearances at the crossing portions 33c located between the conductor members circumferentially. Therefore, cooling capacity can be improved at the coil ends.

Moreover, electric power generation is affected by an electrical short-circuit due to contacts of conductor members of different phase-windings. Therefore, clearances located between conductor members are larger in the second coil-end group 31b than in slots 35, thereby achieving the above-described effects.

A stator according to a second embodiment of the invention is described with reference to FIGS. 8 and 9. In the second embodiment, the clearances can be provided between the conductor members at the end and middle layers.

Straight portions 331a, 331b, 332a and 332b of the small and large segments 331 and 332 in the second embodiment have respectively concave portions 331g, 331h, 332g and 332h at opposite faces in the case of disposing the segments in a multiple form. These concave portions 331g, 331h, 332g and 332h are provided at a portion P, which includes the crossing portions 33c between the conductor-members adjacent to each other when the segments 33 are twisted cicumferentially after inserted into the slots 35.

Figure 8:
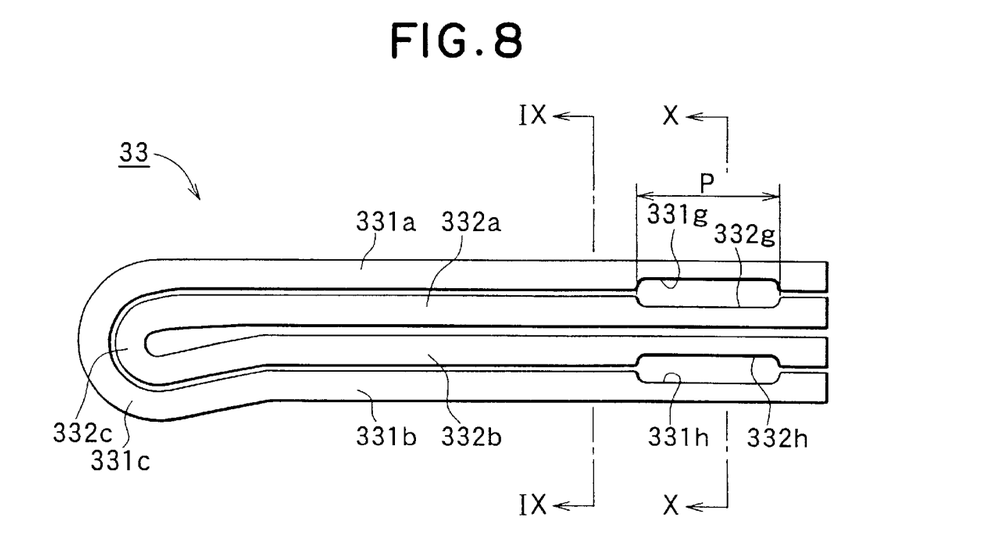
FIG. 8 is an enlarged plan view of segments according to a second embodiment of the invention.

These concave portions 331g, 331h, 332g and 332h are formed in the portions indicated by P as shown in FIGS. 7 and 8. As a result, insulation performance between the conductor members and cooling capacity is improved at portion P of the coil ends, where the conductor members cross each other.

A radial thickness of the conductor members is smaller at these concave portions 331g, 331h, 332g and 332h than portions in the slots 35. Therefore, the clearance between the conductor members is larger at the porion P than in the slot 35.

Further, a radial thickness of the conductor members is smaller at these concave portions 331g, 331h, 332g and 332h than at leading edge portions of the segments 331 and 332. As a result, the clearance between the conductor members can be maintained at the porion P, even after the leading edge portions of the segments are connected.

Figure 9:
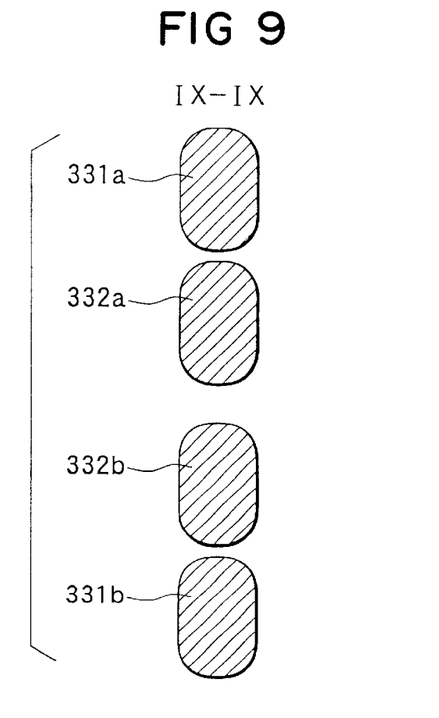
FIG. 9 is an enlarged cross-sectional view taken along line IX—IX in FIG. 8.
Figure 10:
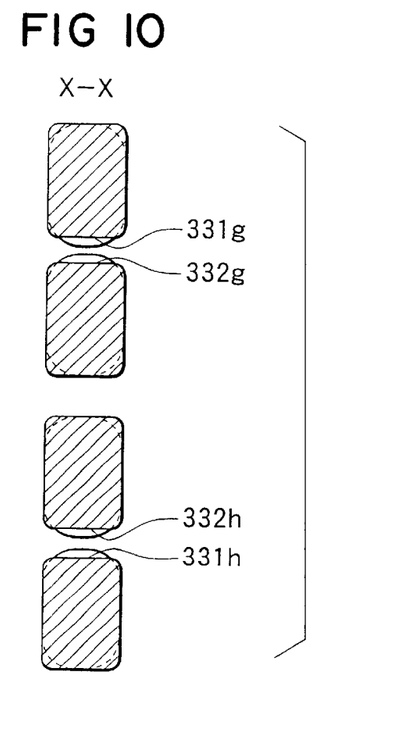
FIG. 10 is an enlarged cross-sectional view taken along line X—X in FIG. 8.

As shown in FIG. 9, the cross section of the conductor member disposed in the slot 35 is elliptic with four round corners. These four round corners have such a large radius as provides a space for taking in a volume of material moved while the conductor members are pressed at the concave portions 331g, 331h, 332g and 332h. As a result, as shown in FIG. 10, the width and cross-sectional area of the conductor member are maintained equal to that shown in FIG. 9 at the concave portions 331g, 331h, 332g and 332h while the radius of the four corners becomes smaller. Accordingly, an inserting process of the segments into the slots 35 cannot be interrupted by the concave portions 331g, 331h, 332g and 332h.

The concave portions 331g, 331h, 332g and 332h are provided by pressing the conductor members, whose cross sectional area is not much deformed, so that damages of the insulation films 37 covering the surface of the conductor member can be prevented.

Further, the concave portions 331g, 331h, 332g and 332h are provided only outside of the slots 35. Accordingly, radial clearances can be smaller between the conductor members in the slot 35. Therefore, insulation performance can be improved at the crossing portions 33c at the coil ends while increasing vibration resistance by decreasing a radially-moving range of the conductor members in the slots 35.

In the second embodiment, the straight portions 331a and 331b of the end-layer conductor members are not required to bend radially after the segments 33 are inserted into the slots. The other manufacturing processes are equal to the first embodiment.

In the second embodiment, the concave portions 331g, 331h, 332g and 332h are provided at opposite faces of the conductor members extending from the end and middle layers. Therefore, clearances can be surely provided between radially-adjacent conductor-members at the second coil-end group 31b. Accordingly, when a vehicle vibrates, damages of the insulation films 37 generated by collisions of the adjacent conductor-members can be prevented so that short-circuit can be prevented between windings different from each other in an electrical phase. Because clearances are provided at the crossing portions 33c between the radially-adjacent conductor-members, inner-fan's centrifugal air-flow and circumferential air-flow can pass through not only network-structural air-flow-paths 36 at the second coil-end group 31b but also radial clearances at the crossing portions 33c between the circumferential conductor-members. Therefore, cooling capacity can be improved at the coil ends.

The same concave portions 331g, 331h, 332g and 332h can be provided at one side of the faces of the conductor members. For example, only the concave portions 331g and 331h can be provided to reduce additional steps such as a pressing step. The volume of the conductor member to be moved at the concave portions can be reduced from the volume covering four corners as shown in FIG. 10 to the volume covering only two corners. Furthermore, the cross section of the conductor member can be arc-shaped only at side surfaces where the concave portions are formed. This structure can reduce the insulation-film damages generated by presswork at the concave portions.

The conductor member can be twisted at the crossing portion 33c and shorter edges thereof can be faced radially instead of the concave portion provided by presswork so that the radial thickness of the conductor member can be small at the crossing portion 33c.

Figure 11:
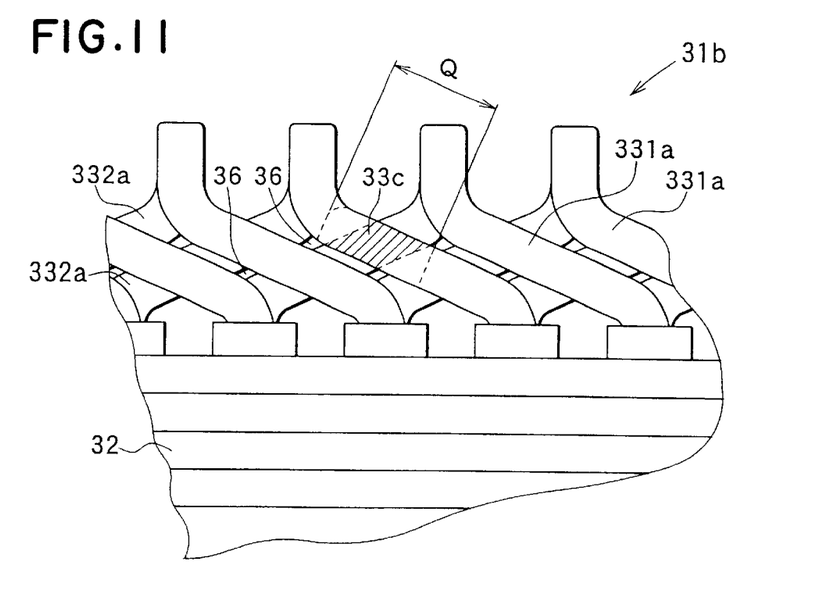
FIG. 11 is a schematic enlarged side view of a second coil-end group according to a third embodiment from inside of the stator.

A stator according to a third embodiment of the invention is described with reference to FIG. 11. The insulation between conductor members are particularly important near the connection portions, because the insulation films coated on the conductor members are damaged near the connecting portions to be exposed to high welding temperature. Therefore, as shown in FIG. 11, portion Q of the concave portion can be limited to only the crossing portion. In this structure, insulation performance can be improved between the conductor members.

Figure 12:
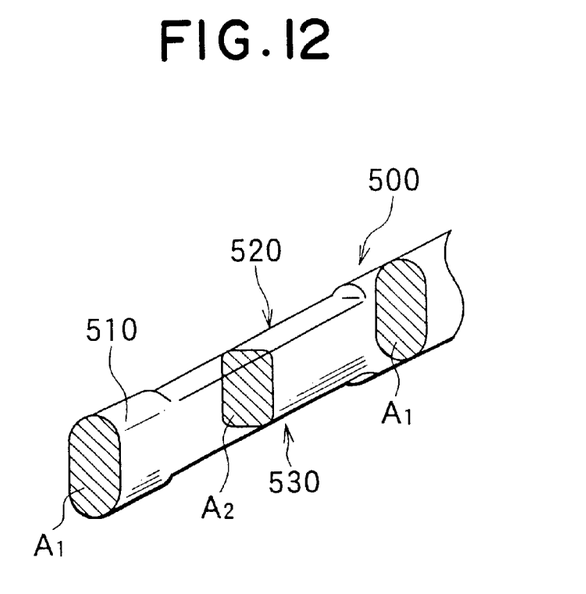
FIG. 12 is a schematic perspective view of an edge portion of a segment according to the third embodiment.
Figure 13:
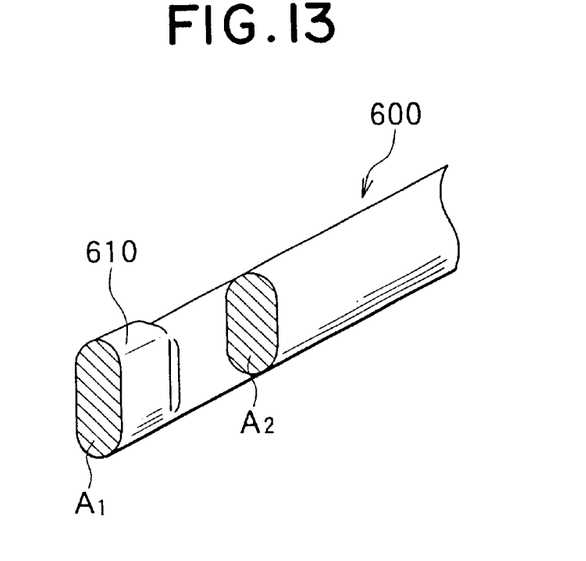
FIG. 13 is a schematic perspective view of an edge portion of a segment according to a variation of the third embodiment of the invention.

As a variation, the concave portions can be formed at both sides of the conductor members, for example, as shown in FIG. 12. An edge portion 510 of a segment 500 is connected with another edge portion. The concave portions 520 and 530, which correspond to the portion P shown in FIG. 8, are formed at both sides of the segment at a lower part than this edge portion 510. Cross-section A1 of the edge portion 510 is equal to that A2 of the concave portions 520 and 530 in an area, and widths at cross-section A1 and A2 are equal. Only the edge portion 610 of the segment 600 shown in FIG. 13 is pressed to be flattened. The edge portion 610 of the segment 600 is connected with another edge portion of a segment by a welder. After the segment is inserted in a stator core, the conductor member is disposed adjacent to another in a longitudinal direction of a cross section of the edge portion 610. Therefore, clearances can be maintained between the conductor members by flattening the cross section A1 of the edge portion 610 of segments 600 to be thinner than the cross section A2 of other portions thereof. Further, areas of the cross sections A1 and A2 are equal. In FIG. 13, widths at cross-sections A1 and A2 are equal to each other. In this structure, because a radial thickness of the conductor member at a portion near the connection portion is larger than the thickness at the crossing portion directly thereunder, clearances between the conductor members can be maintained near the connection portion, thereby providing high insulation performance. In the structure illustrated in FIG. 13, the conductor member extending from the slot spreads a little at a portion near the connection portion, thereby maintaining required clearances.

In the structure illustrated in FIG. 13, the cross section of the edge portion 610 can be widened in both upper-and-lower-side directions.

In the above-described embodiments, as shown in FIG. 3, the turn portions 331c and 332c of two U-shaped conductor-members, that is, those of the big and small segments 331 and 332 are overlapped to form a stator winding. However, more conductor members can be overlapped to form a stator winding. Further, straight conductor members can be connected with each other at both axial end of the stator core 32 instead of U-shaped those. Even in these structures, if clearances are provided between radially opposite faces of the conductor segments radially adjacent to each other, the same operational effects as in the above-described embodiments can be achieved.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator of a vehicle AC generator comprising:
   a stator core having a plurality of slots;
   a multi-phase stator winding formed from a plurality of separate conductor members mounted on said stator core, said stator winding having coil-ends at opposite sides of said stator core; wherein
   portions of said conductor members in each of said coil-ends are radially aligned to have first radial clearances therebetween, and
   said plurality of conductor members are respectively disposed in said plurality of slots in radially lined-up layers.

2. The stator as claimed in claim 1, wherein
   in-slot portions of said conductor members in each of said slots are radially aligned to have second radial clearances therebetween, and
   said first radial clearance is larger than said second radial clearance.

3. The stator as claimed in claim 1, wherein
   said portions of said conductor members at said coil-ends are bent to have said first radial clearances therebetween.

4. The stator as claimed in claim 1, wherein
   said portions of said conductor members disposed at said coil ends are thinned in the radial direction to provide said first radial clearances.

5. The stator as claimed in claim 4, wherein
   said conductor member comprises a concave portion that is thinner in the radial direction than other portions thereof at said coil end.

6. The stator as claimed in claim 1, wherein
   each of said conductor members comprises a connection portion radially wider than other portions thereof at said coil-end.

7. The stator as claimed in claim 1, wherein
   each of said conductor members comprises a connection portion and a step portion thicker in the radial direction than other portions thereof at said coil end.

8. The stator as claimed in claim 1, wherein said coil ends are disposed to be regular in height.

9. A method of manufacturing a stator of a vehicle AC generator comprising:
   providing a stator core having a plurality of slots;
   providing a multi-phase stator winding formed from a plurality of separate conductor members mounted on said stator core, said stator winding having coil-ends at opposite sides of said stator core;
   radially aligning portions of said conductor members in each of said coil-ends to have first radial clearances therebetween; and
   disposing said plurality of conductor members in said plurality of slots in radially lined-up layers.

10. The method of claim 9, further comprising:
    bending first extended portions of said conductor members radially extending from said slots away from second extended portions of said conductor members radially adjacent thereto; and
    bending said first portions in the radially opposite direction to form a clearance between said second portions and said first portions.

* * * * *